United States Patent [19]

Wilkins

[11] Patent Number: 5,556,139
[45] Date of Patent: Sep. 17, 1996

[54] HYDRAULIC COUPLING

[75] Inventor: Steven Wilkins, Union City, Pa.

[73] Assignee: Snap-Tite, Inc., Union City, Pa.

[21] Appl. No.: 197,635

[22] Filed: Feb. 17, 1994

Related U.S. Application Data

[63] Continuation-in-part of Ser. No. 145,688, Oct. 29, 1993, abandoned.

[51] Int. Cl.$^6$ .................................................. F16L 37/28
[52] U.S. Cl. .......................... 285/111; 285/923; 285/348; 285/108
[58] Field of Search .................. 137/614.04; 277/230, 277/177, 176, 205, 207 R; 285/111, 108, 348, 923

[56] References Cited

U.S. PATENT DOCUMENTS

| | | | |
|---|---|---|---|
| 3,890,068 | 6/1975 | Davidson | 418/132 |
| 4,576,387 | 3/1986 | Ghilardi et al. | 277/205 |
| 4,709,726 | 12/1987 | Fitzgibbons | 137/614.05 |
| 4,753,444 | 6/1988 | Jackson et al. | 277/230 |
| 4,768,538 | 9/1988 | Mintz et al. | 137/614.04 |
| 4,884,584 | 12/1989 | Smith | 137/614.04 |
| 5,072,755 | 12/1991 | Wilcox | 137/614.05 |
| 5,085,443 | 2/1992 | Richards | 277/207 R |
| 5,134,030 | 7/1992 | Ueda et al. | 428/365 |
| 5,205,568 | 4/1993 | Stoll et al. | 277/205 |
| 5,232,021 | 8/1993 | Smith | 137/614.04 |

*Primary Examiner*—Eric K. Nicholson
*Attorney, Agent, or Firm*—Woodling, Krost and Rust

[57] ABSTRACT

A hydraulic coupling employing a polymeric elastomeric sealing member to provide an excellent seal under pressure. The polymeric elastomeric seal additionally has high resistance to acids, alkalis, hydrocarbons, ketones, ethers, esters, alcohols and salt solutions. The sealing member has the elasticity to return to its normal physical condition after pressure is removed.

19 Claims, 7 Drawing Sheets

HYDRAULIC COUPLING

This application is a continuation-in-part of U S patent application Ser. No. 08/145 688 filed Oct. 29 1993 entitled "Hydraulic Coupling", now abandoned.

The invention relates in general to hydraulic couplers and particularly to one uniquely adapted for use in subsea applications and other harsh environments.

The prior art of hydraulic couplers illustrate the many and varied sealing members that have been used to seal between male and female members. The sealing members have varied from soft materials such as felt, rubber and soft synthetic resinous materials to hard metal materials such as stainless steel and other metal alloys.

These materials have met with varying success and in most instances the use of one material for a given advantage is a trade off because it also has a given disadvantage. For example, the rubbers and soft synthetic resinous materials do not have sufficient strength to withstand high pressure applications and metal seals are so hard as to scratch or mar the surfaces on the male or female member which they engage to provide the seal. The metal seals also have a tendency to interact with sand and/or to scratch the coupler surfaces.

The purpose and object of this invention is to provide a sealing member in combination with a male and female member of a coupler which fits between the extremes outlined above.

An object of the invention is to provide a sealing member which has sufficient strength to handle high pressure applications but will not scratch or otherwise mar the coupler surfaces. Another object of the invention is to provide a sealing member constructed of a polymeric elastomeric material which has physical characteristics to accomplish the objects stated herein.

Another object of the present invention is to prevent the blowout of the sealing member during disconnection of the male and female members.

The sealing member of the present invention has the correct deformation qualities to provide an excellent seal under pressure but also has the elasticity to return to its normal physical condition after pressure is removed.

In the instant invention, it is desirable that the opening in the sealing member which the male member "sees" be the same diameter each time the male and female member are connected. In the use of metal sealing members or rings the opening gradually becomes larger and larger with each use resulting in a less and less effective seal against flow of fluid along the interface between the sealing member and the movable coupler part.

DESCRIPTION OF THE INVENTION

DETAILED DESCRIPTION OF THE INVENTION

Figure 1:
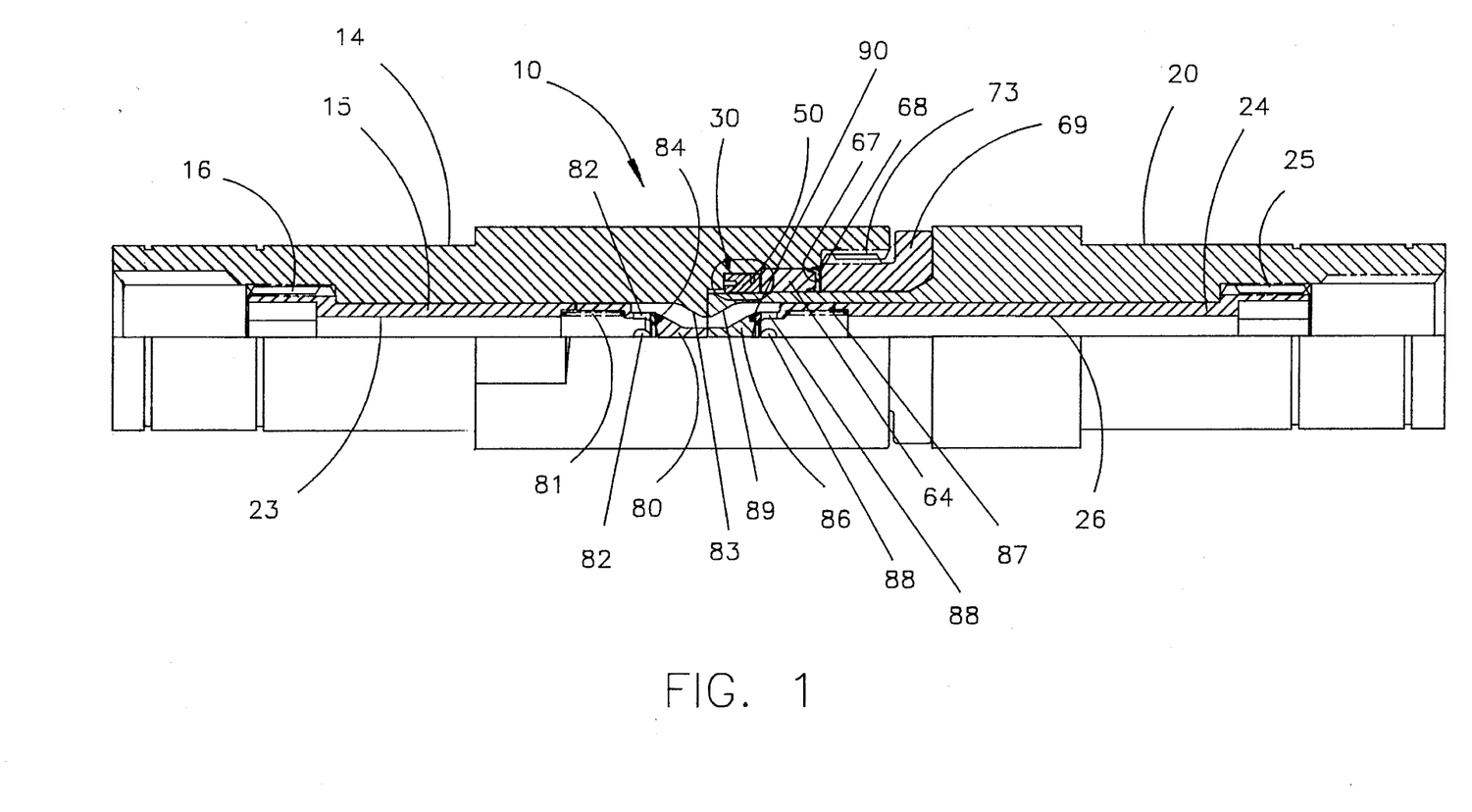
FIG. 1 is an elevational view of the hydraulic coupler of the present invention partially in section and with the male and, female members connected.
Figure 3:
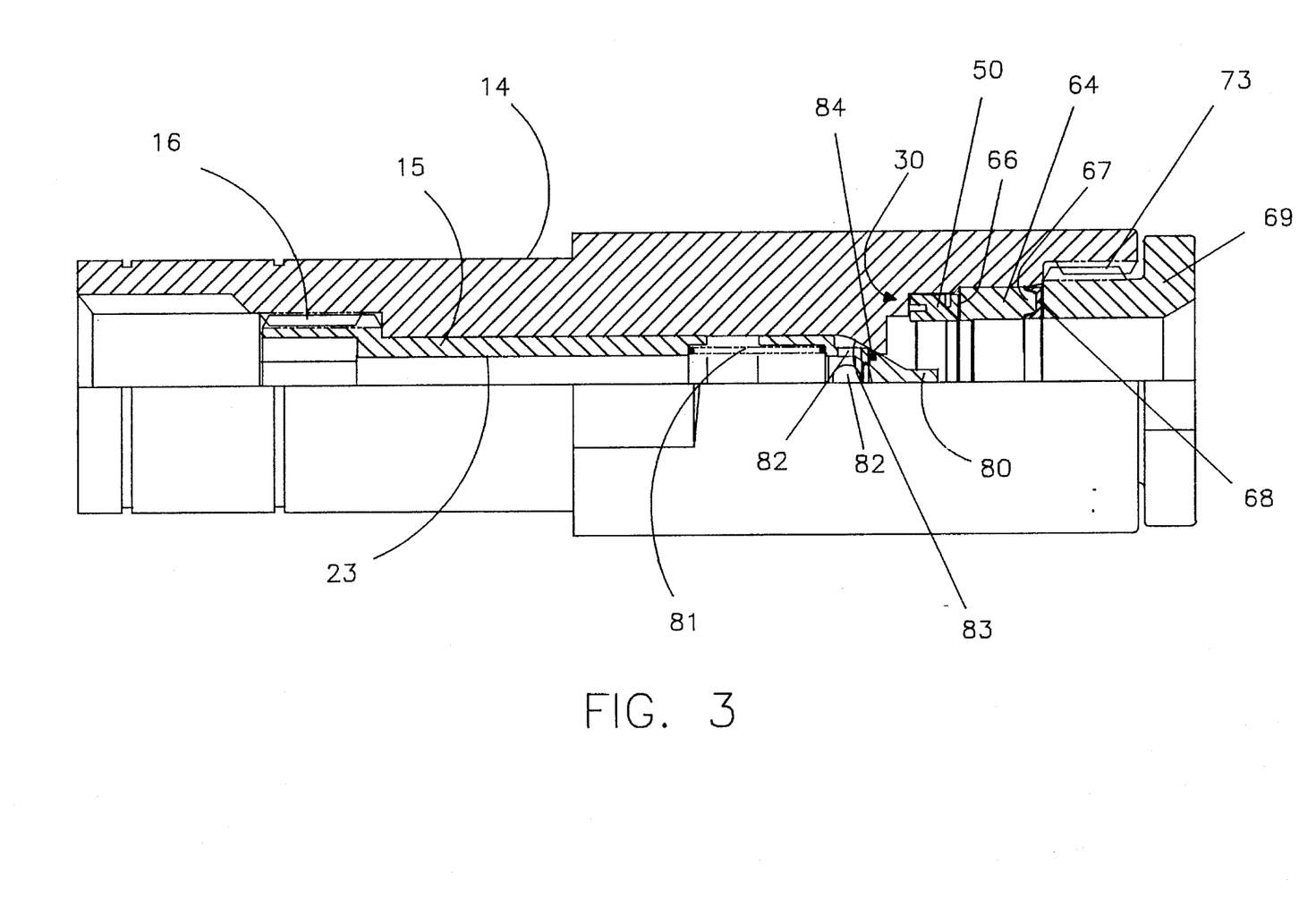
FIG. 3 is a view showing the female coupler members in disconnected condition.
Figure 4:
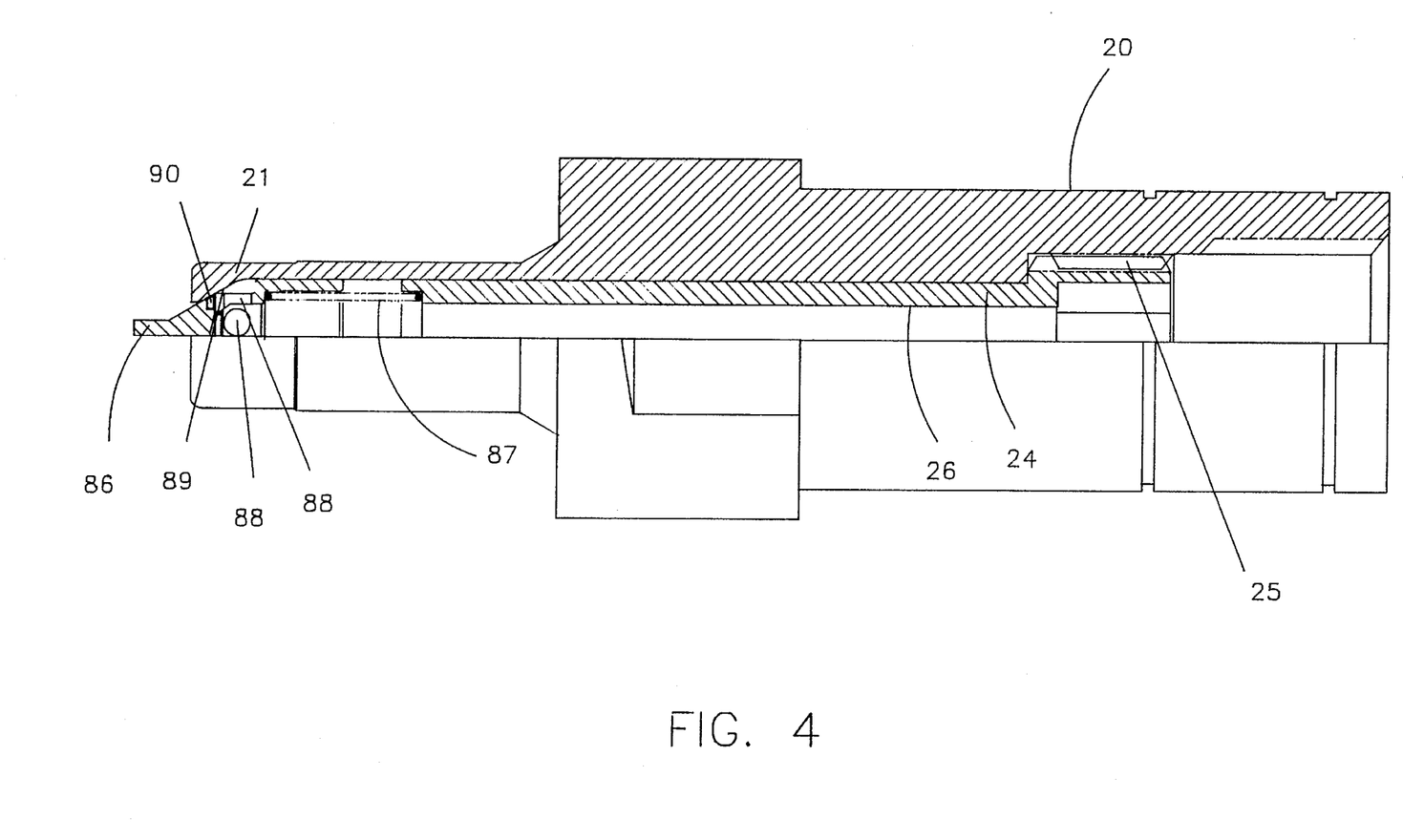
FIG. 4 is a view showing the male coupler in the disconnected condition.

The hydraulic undersea coupler of the present invention is best illustrated in FIGS. 1, 3 and 4 of the drawings and has been identified generally by the reference numeral 10. The coupler includes generally a female member 14 and a male member 20 movable between coupled condition illustrated in FIG. 1 and uncoupled condition illustrated in FIGS. 3 and 4. The female member includes a main body 14 and internal insert member 15 which is threadably secured in place by thread 16 as shown in FIGS. 1 and 3. In similar fashion, the male member includes a main body 20 and includes an internal insert member 24 which is threadably secured in the position shown in FIGS. 1 and 4 by means of threads 25.

First wall means 23 define a first passage or bore through the female member 14 which provides for the flow of fluid from one open end of the female member through the passage and the other end of the female member. In like fashion, second wall means 26 are provided in the male member to define a second passage or bore through the male member to provide for the flow of fluid through one end of the male member to the other end thereof.

A first check valve 80 is provided in the female member as shown in FIGS. 1 and 3 and a spring 81 normally biases the first check valve to its closed condition as illustrated in FIG. 3. A valve seat 83 is provided in the passage of a bore 23 in the female member and this is essentially a surface which is engaged by the check valve and particularly an elastomeric portion 84 on the check valve. The check valve 80 is provided with a plurality of annularly spaced ports 82 which provide for the flow of fluid through the check valve when it is in its open condition as illustrated in FIG. 1.

In like fashion, the male member is provided with a second check valve 86 which is constantly biased or urged to closed condition by a spring 87. The open condition of the check valve 86 is illustrated in FIG. 1 and its closed condition is shown in FIG. 4. The passage or bore 26 of the male member is provided with a valve seat 89 which engages the check valve 86 and particularly an elastomeric portion 90 carried by the check valve when it is in closed position as shown in FIG. 4. The check valve 86 is provided with a plurality of circumferentially spaced ports 88 which provide for the passage of fluid through check valve 86 in its open condition as shown in FIG. 1.

Figure 2:
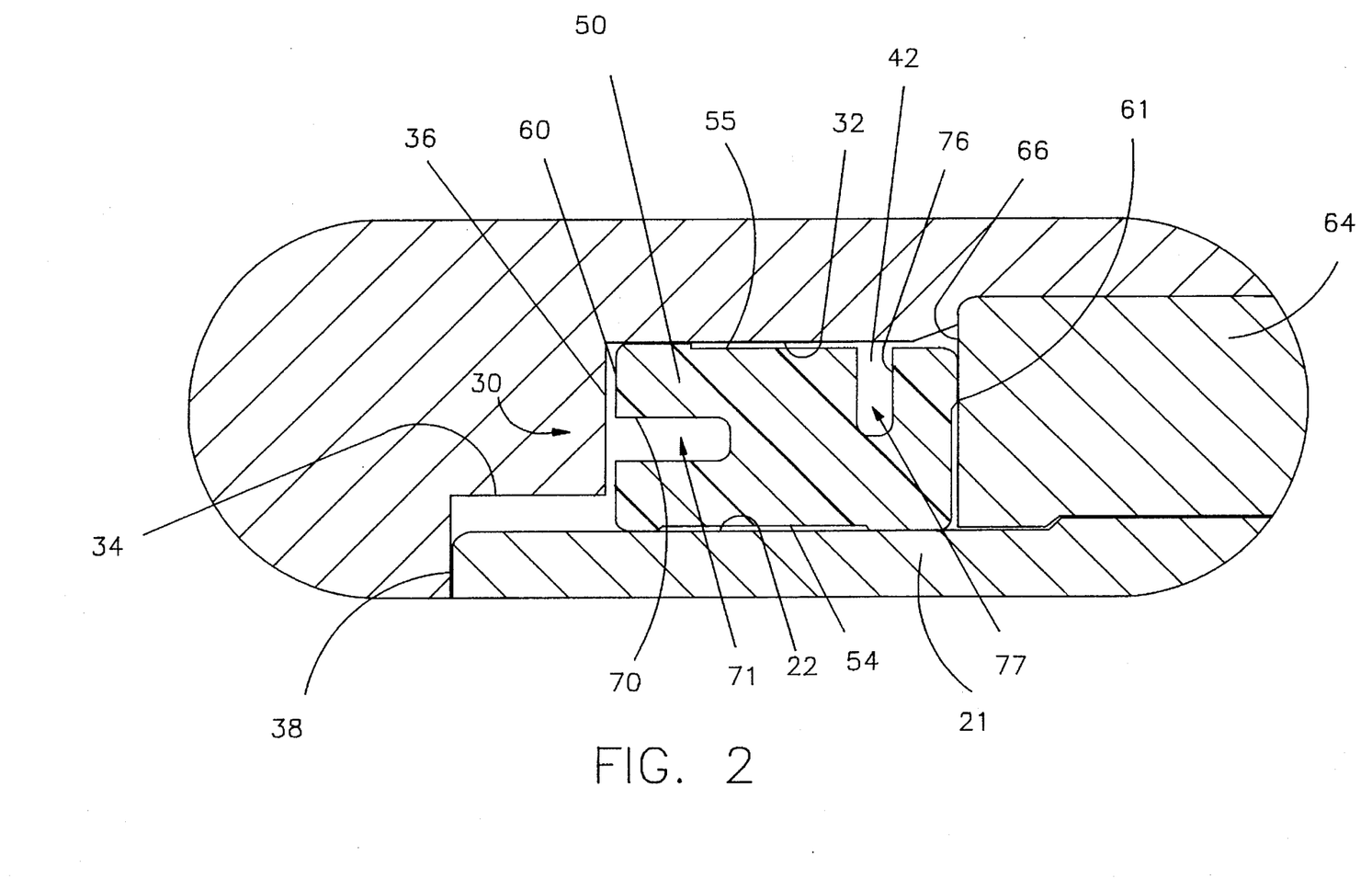
FIG. 2 is an enlarged fragmentary section of a portion of the hydraulic coupler illustrated in FIG. 1.

The first wall means 23 which defines the first passage or first bore in the female member 14 in the end of the female member closest to where the male member 20 is inserted into the female member is provided with a shoulder 30 which is generally shown in FIGS. 1 and 3 and is shown in substantial detail in the enlarged fragmentary view of FIG. 2.

The shoulder 30 is defined by first and second radially spaced and axially extending surfaces 32 and 34 and first and second axially spaced and radially extending surfaces 36 and 38. The male member 20 has a first end portion 21 (FIG. 2) which resides in the first passage or bore 23 of the female member 14 in the coupled condition of the coupler as illustrated in FIG. 1.

The first end portion 21 has an external circumferentially extending surface 22 spaced from the first axially extending surface 32 and located close to the second axially extending surface 34 in the coupled condition best shown in FIGS. 1 and 2. The external surface 22, the first axially extending surface 32 and the first radially extending surface 36 define an annularly extending space or annulus 42. An annularly extending sealing member or seal 50 resides in the space 42. As seen in all of the figures, particularly in FIG. 2, this annularly extending sealing member in cross section is generally rectangularly shaped and as mentioned before, resides in the space 42. The sealing member 50 has inner and outer circumferentially extending surfaces 54 and 55, respectively, lying adjacent the external surface 22 of the male member and the first axially extending surface 32, respectively. The sealing member 50 also has first and second end surfaces 60 and 61, respectively, with the first end surface being located adjacent the first radially extending surface 36.

An annularly extending annular retainer 64 is provide as shown which has first and second axially spaced end surface 66 and 67, respectively, (FIGS. 2 and 3) with the first end surface 66 being located adjacent the second end surface 61 of the sealing member to hold the sealing member in the annular space 42. An adaptor 69 (FIGS. 1 and 3) is threadably connected by means of threads 73 to the body 14 of the female member and serves to hold the annular retainer 64 and the sealing member 5 in the position illustrated in the figures of the drawings. A channel shaped seal 68 which extends annularly around the coupler is interposed between the adaptor 69 and the annular retainer 64 to assist in sealing against the escape of fluid pressure. As best seen in FIG. 2, a first wall 70 extends in the first end surface 60 of the sealing member 50 and defines a first cavity 71 which faces the first radially extending surface 36 of the shoulder and creates a generally C-shaped appearance cross section. In similar manner, a second wall 76 extends into the outer circumferentially extending surface 55 of the sealing member 50 and defines a second cavity 77 facing the first axial extending surface 32 of the shoulder and creating a generally U-shaped appearance in cross section. The sealing member 50 of the present invention is constructed of a polymeric elastomeric material which accomplishes the objects that have been stated hereinabove in a manner consistent with accomplishing the teachings of the present disclosure.

In operation and assuming the coupler is in the uncoupled condition as illustrated in FIGS. 3 and 4, and in this condition, the check valves 80 and 86 are in the closed condition preventing fluid flow through the female member and the male members.

As the male and female members are brought towards coupled condition, the extreme ends of the check valves 80 and 8, engage each other and move each other to the open condition show in FIG. 1 against the force or bias of springs 81 and 87. The male and female members are maintained mechanically in this connected position by a means not shown or illustrated herein but well understood by those skilled in the art. In many instances, the male members are fixedly mounted subsea on a physical support member and a corresponding plurality of the female members are lowered subsea into the connected position of FIG. 1 and held together by a means not illustrated herein.

As the end portion 21 of the male member 20 passes through the inner diameter of the sealing member 50, the external surface 22 of the male member travels closely adjacent the inner surface 54 of the sealing member.

After the male and female member reach their coupled condition as illustrated in FIG. 1 with their respective check valves in open condition, fluid pressure such as hydraulic fluid is caused to flow, for example, from the left end of the female member 14 as viewed in FIG. 1 through the bore 23, through ports 82 and out through the male member through ports 88 and bore 26 in the male member.

In most circumstances, hydraulic couplers of the type illustrated herein deal with relatively high hydraulic fluid pressure, for example, of on the order of four or five thousand psi up to 10,000 psi. Referring to FIG. 2, this fluid pressure finds its way along surfaces 38, 34 and 36 into the generally C-shaped cavity 71. This fluid pressure causes the upper and low, portions of the C-shape to tightly and firmly engage surfaces 3 and 22 respectively preventing the escape of hydraulic fluid along surfaces 32 and 22.

The U-shaped cavity 77 which is provided in the sealing member 50 performs the function of assisting and preventing the escape of fluid pressure along surfaces 32 and 61 under some circumstances. It happens in the operation of couplers such as these which are used subsea that the male member when inserted into the female member may be slightly "cocked" because the axis of the male member is not exactly concentric with the axis of the female member. When this happens, the sealing member may also cocked or twisted in the annular space 42 so that fluid pressures may travel along surfaces 36 and 32 tending to escape past the sealing member. In these circumstances the fluid pressure will be transmitted to the U-shaped cavity 77 which forces the right most leg of the U into firm contact with surface 66 and tends to press surface 55 into engagement with surface 32 tending to provide a better fluid seal under these circumstances. Obviously the U-shaped portion of the seal is an adjunct or addition to the sealing member and is not a necessary inclusion into the sealing member formed by the C-shaped portion of the sealing member which has been defined hereinabove.

Figure 5:
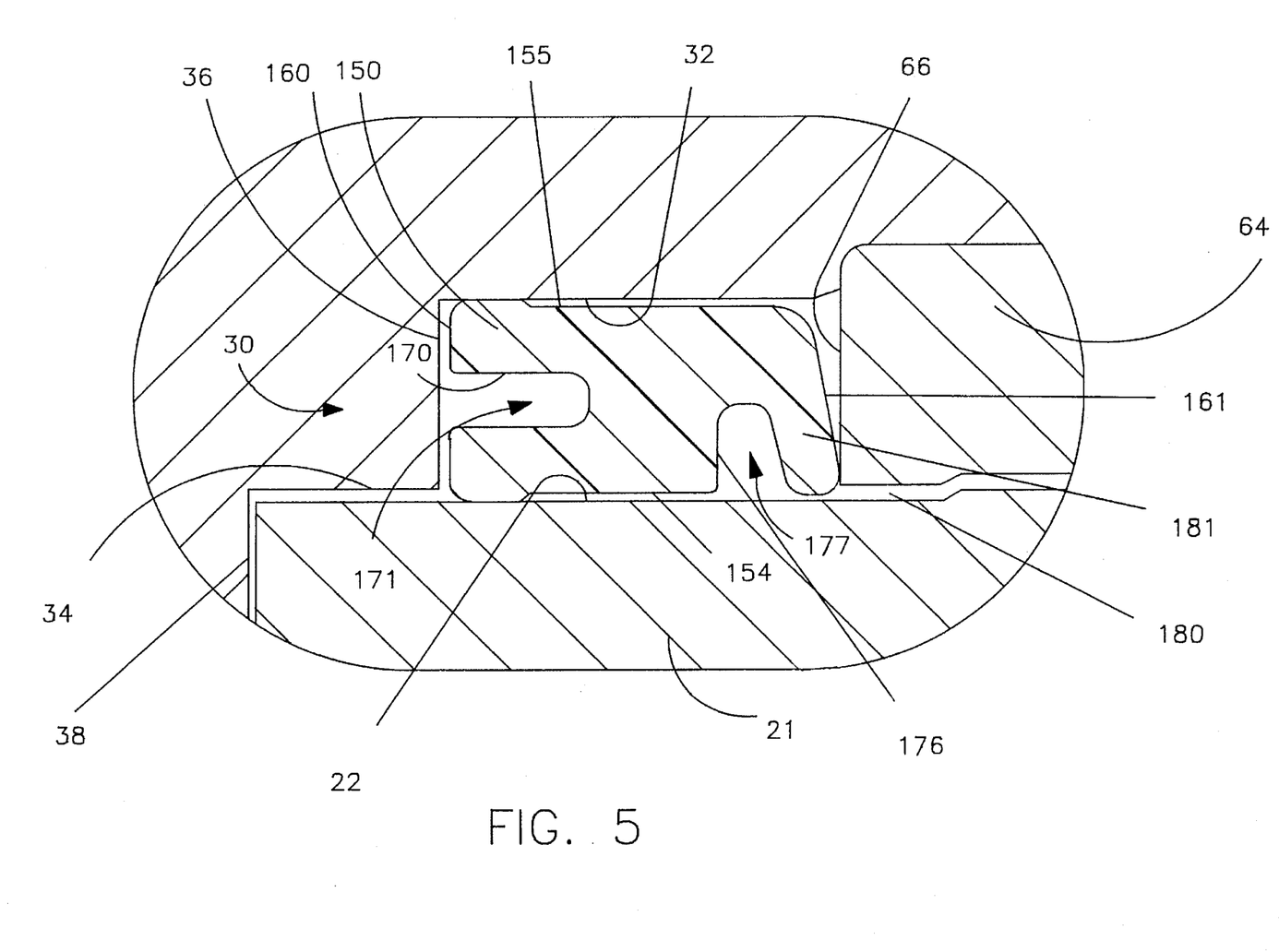
FIG. 5 is an enlarged fragmentary sectional view similar to FIG. 2 but showing a modification of the invention illustrated in FIG. 2.

FIG. 5 illustrates a modification of the invention and shows a sealing member 150 residing in the space 42. In similar fashion, it is generally rectangularly shaped and the inner and outer circumferentially extending surfaces in this embodiment have been identified by the reference numerals 154 a 155, respectively, and they lie respectively adjacent the surfaces 22 and 32. The first and second end surfaces of the sealing member 150 in this embodiment, have been identified by the reference numerals 160 and 161, respectively. The end surface 161 is located adjacent the retainer 64.

A first wall 170 extends into the sealing member 160 and defines a first cavity 171 which faces the surface 36 and creates a generally C-shaped appearance in cross-section. This is quite similar to the construction shown in FIG. 2. A second wall 176 extends into the inner circumferentially extending surface 154 of the sealing member 150 and defines a second cavity 177 which faces the external surface 22 of the male member 20. The cavity 177 creates a generally U-shaped appearance in cross-section which may be referred to more properly as an inverted U-shape.

The structure and function of the device within which the seal of FIG. 5 is incorporated, namely that of the male and female members, is essentially as described in the functioning of the coupler parts illustrated in FIGS. 1, 3 and 4.

When the male and female members are coupled together in connection with the structure illustrated in FIG. 5, the C-shaped cavity 171 which is formed in the sealing member 150 functions essentially in the same manner as described in connection with the C-shaped cavity 71 which is illustrated in FIG. 2.

The inverted U-shaped cavity 177 which is formed in the sealing member 150 performs a general sealing function;

however, it is particularly useful in preventing the entrance of seawater into the internal passages in the male and female members. At times there may be a tendency for seawater to attempt to gain entrance to the internal passageway formed in the coupler members, for example, through the space identified by the reference numeral 180 in FIG. 5 which depending upon the tolerance may provide a clearance between the retainer 64 and the male member 20 and particularly the first end portion 21 thereof. In the event seawater, which is under a relatively high pressure, gains entrance through the space 180 to cavity 177 the pressure which enters cavity 177 has a tendency to force what is referred herein as a leg or leg portion formed by the second cavity 177 into engagement with the wall of the retainer 64 preventing seawater from travelling around the sealing member, for example, to the space between surfaces 32 and 155.

Figure 6:
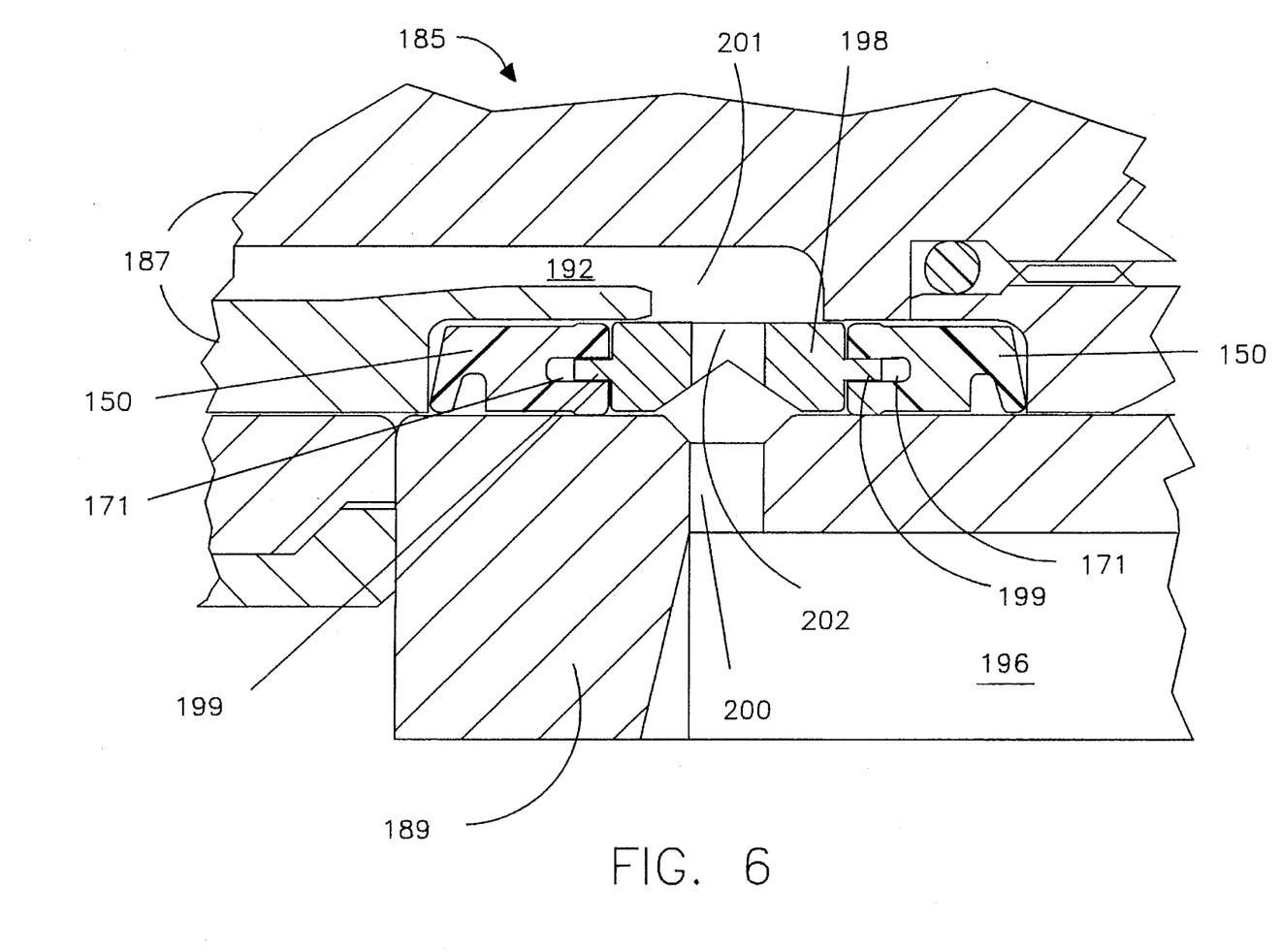
FIGS. 6 is an enlarged fragmentary section illustrating the sealing member shown in FIG. 5 as applied to a balanced coupler.

FIG. 6 illustrates use of the specific embodiment shown in FIG. 5 in a balanced coupler which balanced coupler constructions are known to those skilled in the art and may be generally of the type shown in U.S. Pat. No. 5,072,755 issued Dec. 17, 1991.

Referring specifically to FIG. 6 there is shown and illustrated a balanced coupler which includes a female member 187 and a male member 189 shown in assembled or connected position. The female member is provided with a passageway 192 and the male is formed with passageway 196. Port 200 in the passageway 196 in the male member and port 201 in the passageway 192 in the female member provide for the passage of fluid between the two members. FIG. 6 illustrates two sealing members 150, more specifically described in connection with FIG. 5, illustrated and located in shoulders formed in the female member so as to provide sealing engagement between the outer circumferential surface of the male member 189 and a bore formed in the female member 187. A flow port or spacer 198 which has a port 202 for the passage of fluid is provided and located between the two sealing members 150. The spacer 198 is provided with legs 199 on each side which reside in the cavity 171 in the sealing members 150.

The functioning of the sealing members 150 in the balanced coupler 185 is essentially that as described in connection with the description given in connection with FIG. 5.

It will also be apparent to those skilled in the art that the embodiment of the seal more specifically described in connection with FIG. 2 may also be utilized in connection with the balanced coupler disclosed and described in connection with FIG. 6.

Figure 7:
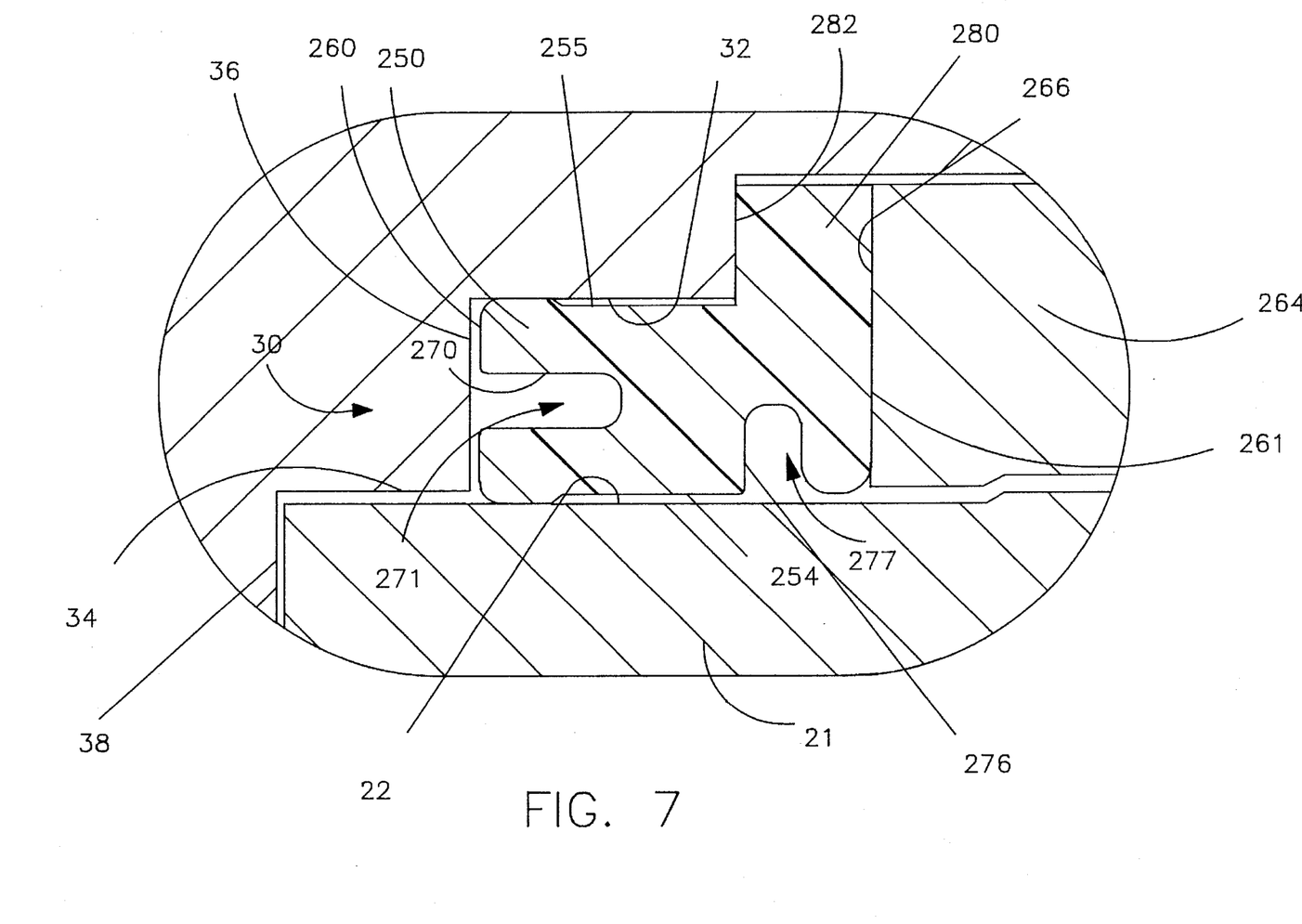
FIG. 7 is an enlarged fragmentary view of a still further modification of the invention over that shown in FIGS. 2 and 5.

FIG. 7 illustrates another modification of the present invention and more particularly a modification of that illustrated in FIGS. 2 and in FIG. 5. In the embodiment of FIG. 7 there is illustrated an annularly extending sealing member 250 which resides in the space again generally referred to as space 42. The sealing member 250 is provided with inner and outer surfaces 254 and 255 which lie respectively adjacent the surfaces 22 and 32. The sealing member 250 in like fashion has first and second end surfaces 260 and 261, respectively, and the first end surface 260 is located adjacent the surface 36.

In this embodiment the annular retainer is identified by the reference numeral 264 and the first end surface of the retainer is identified by the reference numeral 266.

A first wall 270 extends into the sealing member and defines a first cavity 271. The cavity 271 which is defined is quite similar to the cavity 171 which has been discussed in connection with FIG. 5 and the cavity 71 which has been discussed in connection with FIG. 2.

A second wall 276 extends into the inner surface 254 of sealing member 250 and defines a second cavity 277 which faces the circumferentially extending surface 22 of the end portion 21 of male member 20. The cavity 277 defines generally a U-shape or more properly an inverted U-shape.

The right most end of the sealing member 250 as viewed in FIG. 7 is provided with a generally radially extending flange 280. The flange resides in what is referred to as a recess 282 which has been formed in the female member illustrated in this embodiment.

In this particular embodiment illustrated in FIG. 7, the flange as located in the recess 282 and in combination with the annular retainer 264 provides an additional sealing function which prevents the passage of or leakage of fluid along the connection between the male and female members. In this particular embodiment, it is possible to not use the second cavity 277 which has been illustrated herein and the flange and cavity 271 will function together to provide a satisfactory and suitable sealing arrangement.

It has been found that in order to bring about the objects of the present invention as stated hereinabove that it is necessary that all of the sealing members of this invention be constructed of a polymeric elastomeric material which has a tensile strength of at least 5000 psi and a flexural modulus of elasticity of at least 300,000 psi. It is also desirable that the polymeric material have a high chemical resistance to acids, alkalis, hydrocarbons, ketones, ethers, esters, alcohols, salt solutions or a combination of chemicals normally found in oil exploration.

The particular materials that have been found to meet the objects of the present invention and to meet these specified and desired physical and chemical characteristics are found in the following chart:

| Material | Tensile | Elongation | Flexural Modulus of Elasticity | Chemical Resistance | Hardness (Rockwell) |
|---|---|---|---|---|---|
| 1. Poly(aryl etherketone) | 14500 psi | 150% | 550000 psi | 1 | M99 |
| 2. Polyphenylene sulfide | 12000 psi | 20–25% | 540000–600000 psi | 1 | M93 |
| 3. Polyamide-imide | 16000 psi | 5–18% | 1,000,000 psi | 2 | M119 |
| 4. Molybenum disulphide filled nylon | 8000 psi | 5–150% | 400000 psi | 3 | R110 |

With the use of a sealing member having the herein described physical and chemical characteristic in combination with the male and female members of a hydraulic coupler bring about the desired objects as expressed hereinabove. The major accomplishment is that the opening in the sealing member 50 or in other words the inner diameter of the sealing member which the male member "sees" is essentially the same diameter each time the male member enters the female member as they are moved from uncoupled to coupled condition. As a result the same consistent seal is provided because the sealing member of the present invention has the qualities to return to the same consistent diameter when the members are uncoupled. This overcomes the disadvantage found in metal sealing members or rings where the opening gradually becomes larger and larger with each uncoupling or use resulting in a less and less effective seal against fluid flow along inner face between the sealing member and the movable coupler parts.

Material number 1 in the chart is sold under the trademark VICTREX PEEK by ICI Americas Inc. of Wilmington, Del. Material number 2 is sold under the trademark TECHTRON by The Polymer Corporation of Reading, Pa. Material number 3 is sold under the trademark TORLON by Amoco Chemical Corporation. Material number 4 is sold under the trademark NYLATRON by The Polymer Corporation of Reading, Pa.

The present invention prevents the blowout of the sealing member 50 during separation of the male and female members.

While the invention has been described in combination with embodiments thereof, it is evident that many alternatives, modifications and variations will be apparent to those skilled in the art in light of the foregoing description. Accordingly, it is intended to embrace all such alternatives, modifications and variations that fall within the spirit and scope of the appended claims.

What is claimed is:

1. A hydraulic undersea coupler including a female member and a male member movable between coupled and uncoupled conditions, a first wall means defining a first passage through said female member, a second wall means defining a second passage through said male member, said first passage having formed in said wall means a shoulder defined by first and second radially spaced and axially extending surfaces and first and second axially spaced and radially extending surfaces, said male member having a first end portion residing in said first passage of said female member in said coupled condition and permitting flow of fluid through said first and second passages, said first end portion of said male member having an external surface spaced from said first axially extending surface and close to said second axially extending surface in said coupled condition, said external surface and said first axially extending and radially extending surfaces defining an annularly extending space, an annularly extending and in cross section generally rectangularly shaped sealing member residing in said annular space, said sealing member having inner and outer circumferentially extending surfaces lying adjacent said external surface and first axially extending surface respectively, said sealing member having first and second end surfaces with said first end surface being adjacent said first radially extending surface, an annularly extending retainer member having first and second axially spaced end surfaces with said first axially spaced end surface abutting said second end surface of said sealing member to hold said sealing member in said annular space, a first wall extending into said first end surface of said sealing member defining a first cavity facing said first radially extending surface and creating a generally C-shaped appearance in cross section, said first cavity forming first and second leg members in said first end surface of said seal, said first and second leg members of said first cavity urge said inner and outer circumferentially extending surface of said seal into engagement with said external surface of said male member and said first axially extending surface of said female member, respectively, upon the application of pressure within said coupler, a second wall extending into said outer circumferentially extending surface of said sealing member defining a second cavity facing said first axially extending surface and creating a generally U-shaped appearance in cross section, said second cavity residing intermediate said first and said second end surfaces, said second cavity defining third and fourth legs; said third and fourth legs or said second cavity urge said first end surface of said seal against said first radially extending surface of said female member and said second end surface of said seal against said retainer upon the application of pressure externally to said coupler, and, said sealing member being constructed of a polymeric elastomeric material having a tensile strength of at least 5000 psi, a flexural modulus of elasticity of at least 300,000 psi and having a high chemical resistance to acids, alkalis, hydrocarbons, ketones, ethers, esters, alcohols and salt solutions.

2. A hydraulic undersea coupler as claimed in claim 1 wherein the sealing member is constructed of poly(aryletherketone).

3. A hydraulic undersea coupler as claimed in claim 1 wherein the sealing member is constructed of a polyphenylene sulfide.

4. A hydraulic undersea coupler as claimed in claim 1 wherein the sealing member is constructed of a polyamideimide.

5. A hydraulic undersea coupler as claimed in claim 1 wherein the sealing member is constructed of a molybdenum disulphide filled nylon.

6. A hydraulic undersea coupler including a female member and a male member movable between coupled and uncoupled conditions, a first wall means defining a first passage through said female member, a second wall means defining a second passage through said male member, said first passage having formed in said wall means a shoulder defined by an axially extending surface and a radially extending surface, said male member having a first end portion residing in said first passage of said female member in said coupled condition and permitting flow of fluid through said first and second passages, said first end portion of said male member having an external surface spaced from said axially extending surface in said coupled condition, said external surface and said axially extending and radially extending surfaces defining an annularly extending space, an annularly extending and in cross section generally C-shaped sealing member residing in said annular space, said sealing member having inner and outer circumferentially extending portions lying adjacent said external surface and said axially extending surface respectively, an annularly extending retainer member abutting said sealing member to hold said sealing member in said annular space, a channel-shaped seal member and an adaptor, means for affixing said adaptor to said female member, said channel-shaped seal member engaging said retainer and said adaptor, and said sealing member and said channel-shaped member being constructed of a polymeric elastomeric material having a tensile strength of at least 5000 psi, a flexural modulus of elasticity of at least 300,000 psi and having a high chemical resistance to liquid media.

7. A hydraulic undersea coupler as claimed in claim 6 wherein the sealing member is constructed of poly(aryletherketone).

8. A hydraulic undersea coupler as claimed in claim 6 wherein the sealing member is constructed of a polyphenylene sulfide.

9. A hydraulic undersea coupler as claimed in claim 6 wherein the sealing member is constructed of a polyamideimide.

10. A hydraulic undersea coupler as claimed in claim 6 wherein the sealing member is constructed of a molybdenum disulphide filled nylon.

11. A hydraulic undersea coupler as claimed in claim 6 wherein the open end of said C-shaped sealing member faces said radially extending surface.

12. A hydraulic undersea coupler as claimed in claim 6 wherein said C-shaped sealing member includes a U-shaped portion with the open end of said U-shape facing said axially extending surface.

13. A hydraulic undersea coupler as claimed in claim 6 wherein said C-shaped sealing member includes a U-shaped portion with the open end of said U-shape facing said external surface of said male member.

14. A hydraulic undersea coupler as claimed in claim 6 wherein said C-shaped sealing member includes a flanged portion adapted to be engaged by walls on said female member.

15. A hydraulic coupler comprising a male member and a female member, said male member includes an external surface, an annulus formed between said external surface of said male member and said female members, said female member having a first radially extending surface, said female member having a first axially extending surface, a seal, said seal residing in said annulus, a retainer, said retainer abutting said seal to hold said seal in said annulus, said seal a having first cavity in said first end surface, said first cavity defining first and second legs said first cavity facing said first radially extending surface and being C-shaped in cross section, said first and second legs of said first cavity engagingly seal against said first axially extending surface and said external surface of said male, respectively, upon the application of pressure within said coupler, said seal having a second cavity residing intermediate said first and second end surfaces, said second cavity defining third and fourth legs, said second cavity facing said first axially extending surface and being U-Shaped in cross section, said third and fourth legs of said second cavity urge said first end surface of said seal against said first radially extending surface of said female and said second end surface of said seal against said retainer upon the application of pressure externally to said coupler, said seal being a polymeric elastomeric material having a tensile strength of at least 5000 psi and a flexural modulus of elasticity of at least 300,000 psi.

16. A hydraulic coupler as claimed in claim 15 wherein said seal is constructed of poly-(aryletherketone).

17. A hydraulic coupler as claimed in claim 15 wherein said seal is constructed of polyphenylene sulfide.

18. A hydraulic coupler as claimed in claim 15 wherein said seal is constructed of polyamide-imide.

19. A hydraulic coupler as claimed in claim 15 wherein said seal is constructed of molybdenum disulfide nylon.

* * * * *

UNITED STATES PATENT AND TRADEMARK OFFICE
CERTIFICATE OF CORRECTION

PATENT NO. : 5,556,139
DATED : September 17, 1996
INVENTOR(S) : Steven Wilkins

It is certified that error appears in the above-indentified patent and that said Letters Patent is hereby corrected as shown below:

```
Column 1, line 50, delete "INVENTION"
    and insert -- DRAWINGS --.

Column 1, line 54, after "and" delete ",,".

Column 1, line 65, delete "FIGS." and insert --FIG.--.
```

Signed and Sealed this

Eighteenth Day of March, 1997

Attest:

BRUCE LEHMAN

*Attesting Officer*  Commissioner of Patents and Trademarks